(12) United States Patent
Goodman et al.

(10) Patent No.: US 7,634,810 B2
(45) Date of Patent: Dec. 15, 2009

(54) PHISHING DETECTION, PREVENTION, AND NOTIFICATION

(75) Inventors: Joshua T. Goodman, Redmond, WA (US); Paul S Rehfuss, Seattle, WA (US); Robert L. Rounthwaite, Fall City, WA (US); Manav Mishra, Kirkland, WA (US); Geoffrey J Hulten, Lynwood, WA (US); Kenneth G Richards, Newcastle, WA (US); Aaron H Averbuch, Redmond, WA (US); Anthony P. Penta, Bellevue, WA (US); Roderic C Deyo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 11/129,222

(22) Filed: May 13, 2005

(65) Prior Publication Data

US 2006/0123464 A1    Jun. 8, 2006

Related U.S. Application Data

(60) Provisional application No. 60/632,649, filed on Dec. 2, 2004.

(51) Int. Cl.
*H04L 29/06* (2006.01)
*G06F 21/00* (2006.01)

(52) U.S. Cl. ...................................... 726/22
(58) Field of Classification Search ............. 726/2, 726/22–25; 709/223–225, 229
See application file for complete search history.

(56) References Cited

U.S. PATENT DOCUMENTS

| | | | |
|---|---|---|---|
| 5,774,588 A | 6/1998 | Li | |
| 6,321,267 B1 | 11/2001 | Donaldson | |
| 6,507,866 B1 * | 1/2003 | Barchi | ......................... 709/207 |
| 7,219,148 B2 * | 5/2007 | Rounthwaite et al. | ........ 709/224 |
| 7,249,175 B1 * | 7/2007 | Donaldson | ................... 709/225 |
| 7,313,691 B2 | 12/2007 | Bantz et al. | |

(Continued)

OTHER PUBLICATIONS

Gilleland et al., "Levenshtein Distance, in Three Flavors", retrieved at <<http://web.archive.org/web/20030201161115/http://www.merriampark.com/Id.htm>>, Feb. 2003, 13 pages.

(Continued)

*Primary Examiner*—Gilberto Barron, Jr.
*Assistant Examiner*—Abdulhakim Nobahar
(74) *Attorney, Agent, or Firm*—Lee & Hayes, PLLC

(57) ABSTRACT

Phishing detection, prevention, and notification is described. In an embodiment, a messaging application facilitates communication via a messaging user interface, and receives a communication, such as an email message, from a domain. A phishing detection module detects a phishing attack in the communication by determining that the domain is similar to a known phishing domain, or by detecting suspicious network properties of the domain. In another embodiment, a Web browsing application receives content, such as data for a Web page, from a network-based resource, such as a Web site or domain. The Web browsing application initiates a display of the content, and a phishing detection module detects a phishing attack in the content by determining that a domain of the network-based resource is similar to a known phishing domain, or that an address of the network-based resource from which the content is received has suspicious network properties.

10 Claims, 10 Drawing Sheets

U.S. PATENT DOCUMENTS

| | | |
|---|---|---|
| 7,331,062 B2 | 2/2008 | Alagna et al. |
| 7,366,761 B2 * | 4/2008 | Murray et al. ............... 709/206 |
| 2004/0024817 A1 * | 2/2004 | Pinkas ........................ 709/203 |
| 2004/0177110 A1 | 9/2004 | Rounthwaite et al. |
| 2005/0060297 A1 | 3/2005 | Najork |
| 2006/0015630 A1 * | 1/2006 | Stolfo et al. ................. 709/230 |
| 2006/0021031 A1 | 1/2006 | Leahy et al. |
| 2006/0068755 A1 | 3/2006 | Shraim et al. |
| 2006/0095955 A1 | 5/2006 | Vong |
| 2006/0101120 A1 | 5/2006 | Helsper et al. |
| 2006/0155751 A1 * | 7/2006 | Geshwind et al. ........... 707/102 |
| 2007/0101423 A1 | 5/2007 | Oliver et al. |
| 2007/0299915 A1 | 12/2007 | Shraim et al. |

OTHER PUBLICATIONS

Tedeschi, "Protect Your Identity", retrieved on Jan. 16, 2009 at <<http://www.pcworld.com/article/118241-9/protect_your_identity.html>>, PC World, Oct. 2004, pp. 1-7.

* cited by examiner

PHISHING DETECTION, PREVENTION, AND NOTIFICATION

RELATED APPLICATION

This application claims priority to U.S. Provisional Application Ser. No. 60/632,649 filed Dec. 2, 2004, entitled "Detection, Prevention, and Notification of Fraudulent Email and/or Web Pages" to Goodman et al., the disclosure of which is incorporated by reference herein.

TECHNICAL FIELD

This invention relates to phishing detection, prevention, and notification.

BACKGROUND

As the Internet and electronic mail ("email", also "e-mail") continues to be utilized by an ever increasing number of users, so does fraudulent and criminal activity via the Internet and email increase. Phishing is becoming more prevalent and is a growing concern that can take different forms. For example, a "phisher" can target an unsuspecting computer user with a deceptive email that is an attempt to elicit the user to respond with personal and/or financial information that can then be used for monetary gain. Often a deceptive email may appear to be legitimate or authentic, and from a well-known and/or trusted business site. A deceptive email may also appear to be from, or affiliated with, a user's bank or other creditor to further entice the user to navigate to a phishing Web site.

A deceptive email may entice an unsuspecting user to visit a phishing Web site and enter personal and/or financial information which is captured at the phishing Web site. For example, a computer user may receive an email with a message that indicates a financial account has been compromised, an account problem needs to be attended to, and/or to verify the user's credentials. The email will also likely include a clickable (or otherwise "selectable") link to a phishing Web site where the user is requested to enter private information such as an account number, password or PIN information, mother's maiden name, social security number, credit card number, and the like. Alternatively, the deceptive email may simply entice the user to reply, fax, IM (instant message), email, or telephone with the personal and/or financial information that the requesting phisher is attempting to obtain.

SUMMARY

Phishing detection, prevention, and notification is described herein.

In an implementation, a messaging application facilitates communication via a messaging user interface, and receives a communication, such as an email message, from a domain. A phishing detection module detects a phishing attack in the communication by determining that the domain from which the communication is received is similar to a known phishing domain, or by detecting suspicious network properties of the domain from which the communication is received.

In another implementation, a Web browsing application receives content, such as data for a Web page, from a network-based resource, such as a Web site or domain. The Web browsing application initiates a display of the content, and a phishing detection module detects a phishing attack in the content by determining that a domain of the network-based resource is similar to a known phishing domain, or that an address of the network-based resource from which the content is received has suspicious network properties.

BRIEF DESCRIPTION OF THE DRAWINGS

The same numbers are used throughout the drawings to reference like features and components.

DETAILED DESCRIPTION

Phishing detection, prevention, and notification can be implemented to minimize phishing attacks by detecting, preventing, and warning users when a communication, such as an email, is received from a known or suspected phishing domain or sender, when a known or suspected phishing Web site is referenced in an email, and/or when a computer user visits a known or suspected phishing Web site. A fraudulent or phishing email can include any form of a deceptive email message or format that may include spoofed content and/or phishing content. Similarly, a fraudulent or phishing Web site can include any form of a deceptive Web page that may include spoofed content, phishing content, and/or fraudulent requests for private, personal, and/or financial information.

In an embodiment of the phishing detection, prevention, and notification, a history of Web sites visited by a user is checked against a list of known phishing Web sites. If a URL (Uniform Resource Locator) that corresponds to a known phishing Web site is located in the history of visited Web sites, the user can be warned via an email message or via a browser displayed message that the phishing Web site has been visited and/or private information has been submitted. In a further embodiment, the warning message (e.g., an email or message displayed through a Web browser) can contain an explanation that the phishing Web site is a spoof of a legitimate Web site and that the phishing Web site is not affiliated with the legitimate Web site.

The systems and methods described herein also provide for detecting whether a referenced URL corresponds to a phishing Web site using a form of edit detection where the similarity of a fraudulent URL is compared against known and trusted URLs. Accordingly, the greater the similarity between a fraudulent URL for a phishing Web site and a URL for a legitimate Web site, the more likely it is that the fraudulent URL corresponds to a phishing Web site.

While aspects of the described systems and methods for phishing detection, prevention, and notification can be implemented in any number of different computing systems, environments, and/or configurations, embodiments of phishing detection, prevention, and notification are described in the context of the following exemplary system architecture.

Figure 1:
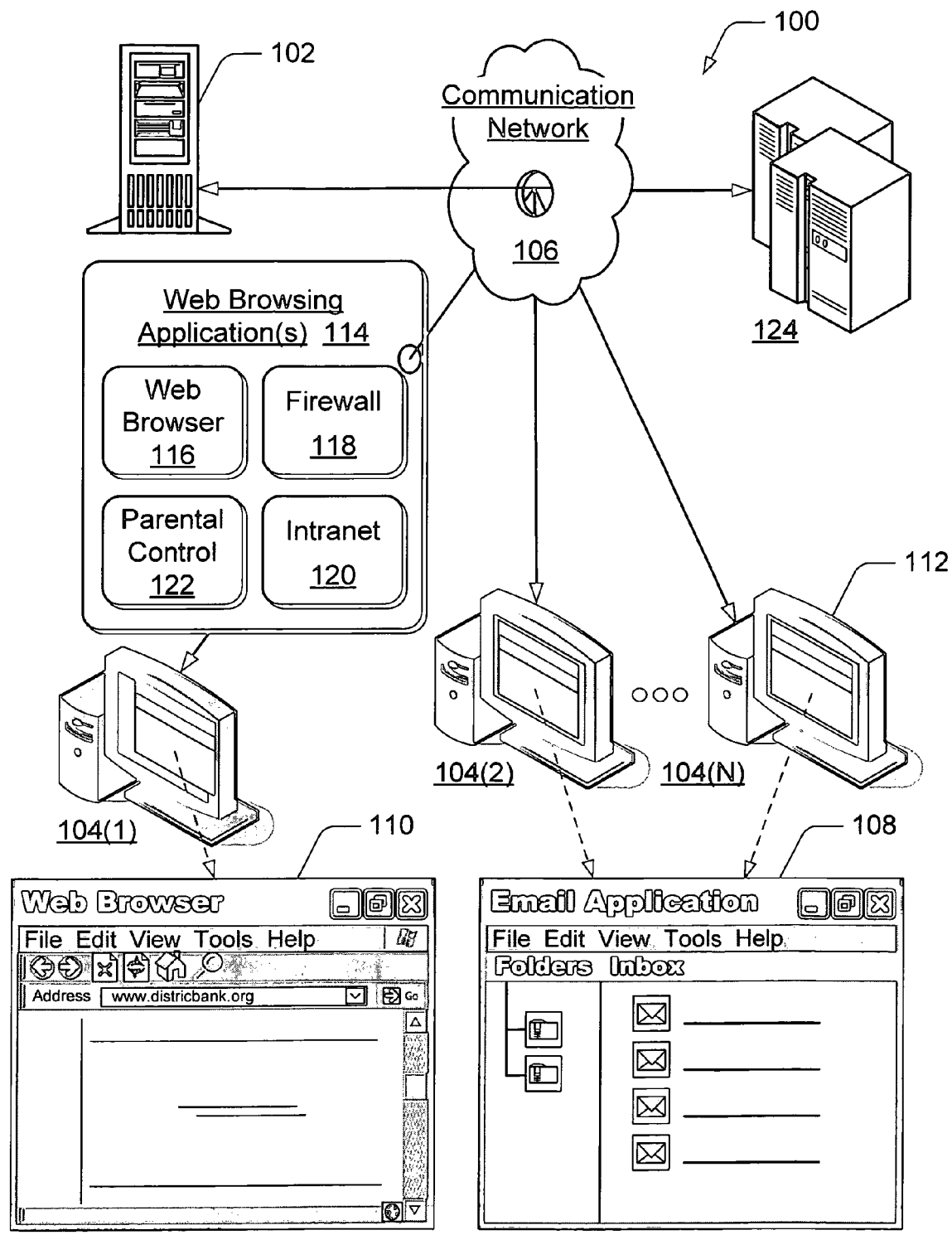
FIG. 1 illustrates an exemplary client-server system in which embodiments of phishing detection, prevention, and notification can be implemented.

FIG. 1 illustrates an exemplary client-server system 100 in which embodiments of phishing detection, prevention, and notification can be implemented. The client-server system 100 includes a server device 102 and any number of client devices 104(1-N) configured for communication with server device 102 via a communication network 106, such as an intranet or the Internet. A client and/or server device may be implemented as any form of computing or electronic device with any number and combination of differing components as described below with reference to the exemplary computing device 400 shown in FIG. 4, and with reference to the exemplary computing environment 1000 shown in FIG. 10.

In an implementation of the exemplary client-server system 100, any one or more of the client devices 104(1-N) can implement a messaging application to generate a messaging user interface 108 (shown as an email user interface in this example) and/or a Web browsing application to generate a Web browser user interface 110 for display on a display device (e.g., display device 112 of client device 104(N)). A Web browsing application can include a Web browser, a browser plug-in or extension, a browser toolbar, or any other application that may be implemented to browse the Web and Web pages. The messaging user interface 108 and the Web browser user interface 110 facilitate user communication and interaction with other computer users and devices via the communication network 106.

Any one or more of the client devices 104(1-N) can include various Web browsing application(s) 114 that can be modified or implemented to facilitate Web browsing, and which can be included as part of a data path between a client device 104 and the communication network 106 (e.g., the Internet). The Web browsing application(s) 114 can implement various embodiments of phishing detection, prevention, and notification and include a Web browser application 116, a firewall 118, an intranet system 120, and/or a parental control system 122. Any number of other various applications can be implemented in the data path to facilitate Web browsing and to implement phishing detection, prevention, and notification.

The system 100 also includes any number of other computing device(s) 124 that can be connected via the communication network 106 (e.g., the Internet) to the server device 102 and/or to any number of the client devices 104(1-N). In this example, a computing device 124 hosts a phishing Web site that an unsuspecting user at a client device 104 may navigate to from a selectable link in a deceptive email. Once at the phishing Web site, the unsuspecting user may be elicited to provide personal, confidential, and/or financial information (also collectively referred to herein as "private information"). Private information obtained from a user is typically collected at a phishing Web site (e.g., at computing device 124) and is then sent to a phisher at a different Web site or via email where the phisher can use the collected private information for monetary gain at the user's expense.

Figure 2:
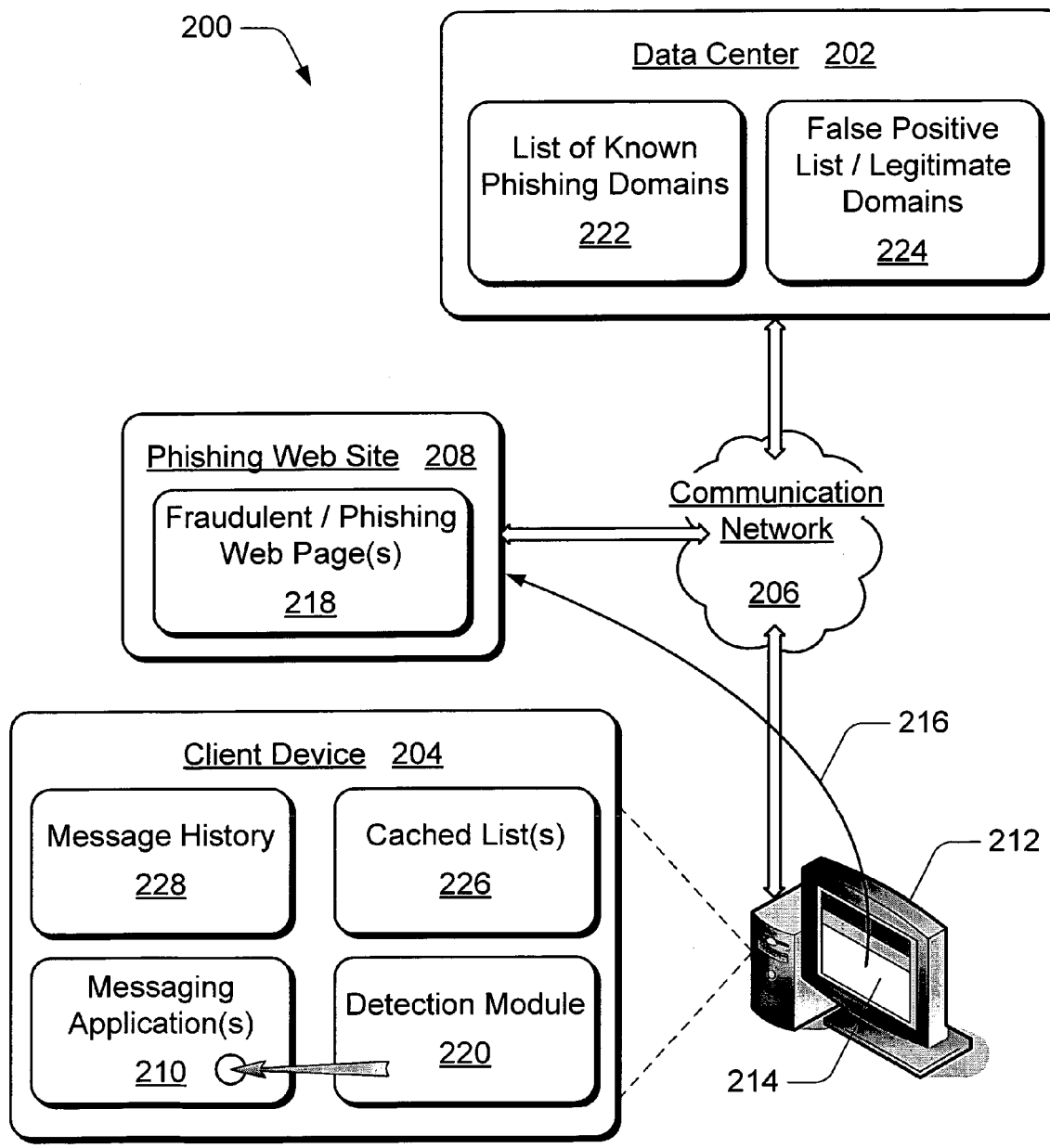
FIG. 2 illustrates an exemplary messaging system in which embodiments of phishing detection, prevention, and notification can be implemented.

FIG. 2 illustrates an exemplary messaging system 200 in which embodiments of phishing detection, prevention, and notification can be implemented. The system 200 includes a data center 202 and a client device 204 configured for communication with data center 202 via a communication network 206. The system 200 also includes a phishing Web site 208 connected via the communication network 206 to the data center 202 and/or to the client device 204.

In an embodiment, data center 202 can be implemented as server device 102 shown in FIG. 1, any number of the client devices 104(1-N) can be implemented as client device 204, and computing device 124 can be implemented as phishing Web site 208. The data center 202 and/or the client device 204 may be implemented as any form of a computing or electronic device with any number and combination of differing components as described below with reference to the exemplary computing device 600 shown in FIG. 6, and with reference to the exemplary computing environment 1000 shown in FIG. 10.

The client device 204 is an example of a messaging client that includes messaging application(s) 210 which may include an email application, an IM (Instant Messaging) application, and/or a chat-based application. A messaging application 210 generates a messaging user interface (e.g., email user interface 108) for display on a display device 212. In this example, client device 204 may receive a deceptive or fraudulent email 214, and a user interacting with client device 204 via an email application 210 and the user interface 108 may be enticed to navigate 216 to a fraudulent or phishing Web page 218 hosted at the phishing Web site 208. When a user selects a link within a phishing email and is then directed to the phishing Web page 218 via client device 204, a phisher can then obtain private information corresponding to the user, and use the information for monetary gain at the user's expense.

Client device 204 includes a detection module 220 that can be implemented as a component of a messaging application 210 to implement phishing detection, prevention, and notification. The detection module 220 can be implemented as any one or combination of hardware, software, firmware, code, and/or logic in an embodiment of phishing detection, prevention, and notification. Although detection module 220 for is illustrated and described as a single module or application, the detection module 220 can be implemented as several component applications distributed to each perform one or more functions of phishing detection, prevention, and notification. Further, although detection module 220 is illustrated and described as communicating with the data center 202 which includes a list of known phishing domains 222, as well as a false positive list 224 of known legitimate domains, the detection module 220 can be implemented to incorporate the lists 222 and 224.

Detection module 220 can be implemented as integrated code of a messaging application 210, and can include algorithm(s) for the detection of fraudulent and/or deceptive phishing communications and/or messages, such as emails for example. The algorithms can be generated and/or updated at the data center 202, and then distributed to the client device 204 as an update to the detection module 220. An update to the detection module 220 can be communicated from the data center 202 via communication network 206, or an update can be distributed via computer readable media, such as a CD (compact disc) or other portable memory device.

Detection module 220 associated with a messaging application 210 is implemented to detect phishing when a user interacts with the messaging application 210 through a messaging application user interface (e.g., email user interface 108 shown in FIG. 1). Detection module 220 associated with the messaging application 210 implements features for phishing detection, prevention, and notification of fraudulent, deceptive, and/or phishing communications and messages, such as emails for example.

Detection module 220 for messaging application 210 can detect numerous aspects of a phishing message or email. For example, the data or name in a "From" field of an email can appear to be from a legitimate domain or Web site such as "DistricBank.com", but with a similar name substitution such as "DistricBanc.com", "DistricBank.net", "DistricBank.org", "D1str1cBank.com", and the like. User-selectable links to phishing Web sites or other network-based resources included in a phishing email message can also be obscured in these and other various ways.

Data center 202 maintains the list of known phishing domains 222, as well as the false positive list 224 of known legitimate domains (i.e., known false positives) that have been deemed safe for user interaction. The false positive list 224 is a list of entities which have erroneously been marked bad, but are in fact good domains. The data center 202 may also maintain a whitelist of known false positives which is a list of things known to be good which may or may not have ever been marked as bad. In both cases, the entries in the list(s) are all good, but the false positive list 224 is more restrictive about how and/or what elements are included in the list.

A known phishing domain can be either a known target of phishing attacks (e.g. a legitimate business that phishers imitate), or a domain known to be a phishing domain, such as a domain that is implemented by phishers to steal information. The list of known phishing domains 222 includes a list of known bad URLs (e.g., URLs associated with phishing Web sites) and a list of suffixes of the known bad URLs. For example, if "www.DistricBanc.com" is a known phishing domain, then a suffix "districbanc.com" may also be included in the list of known phishing domains 222. In addition, the list of known phishing domains 222 may also include a list of known good (or legitimate) domains that are frequently targeted by phishers, such as "DistricBank.com".

The data center 202 publishes the list of known phishing domains 222 to the client device 204 which maintains the list as a cached list 226 of the known phishing domains. The data center 202 may also publish a list of known non-phishing domains (not shown) to the client device 204 which maintains the list as another of the cached list(s). In an alternate implementation, the client device 204 queries the data center 202 before each domain is visited to determine whether the particular domain is a known or suspected phishing domain. A response to such a query can also be cached. If a user then visits or attempts to visit a known or suspected phishing domain, the user can be blocked or warned. However, the list of known phishing domains 222 may not be updated quickly enough. In some instances, a user may receive a fraudulent or phishing message from phishing domain (e.g., from the phishing Web site 208) before the list of known phishing domains 222 is updated at data center 202 to include the phishing Web site 208, and before the list is published to the client device 204.

The client device 204 includes a message history 228 which would indicate that a user has received a suspected fraudulent or phishing message, such as an email, while interacting through client device 204 and a messaging application 210. After the list of known phishing domains 222 is updated at the data center 202 and/or after the data center 202 publishes the list of known phishing domains 222 to the client device 204, the message history 228 can be compared to the list of known phishing domains 222 and/or to the cached list 226 of the known phishing domains to determine whether the user has unknowingly received a fraudulent or phishing message or email.

If it is determined after the fact that a fraudulent or phishing message has been received, a warning message can be displayed to inform the user of the suspected fraudulent message. The user can then make an informed decision about what to do next, such as if the user replied to the message and provided any personal or financial information. This can give the user time to notify his or her bank, or other related business, of the information disclosure and thus preclude fraudulent use of the information that may result from the disclosure of the private information.

A phishing attack, or similar inquiry from a deceptive email, may not direct a user to a phishing Web site. Rather, an unsuspecting user may be instructed in the message to call a phone number or to fax personal information to a number that has been provided for the user in the message. There may also be phishing attacks that ask the user to send an email to an address associated with a phisher. If the user has received and previewed any such deceptive messages, the user can be warned after receiving the message, but before responding to the deceptive request for personal and/or financial information corresponding to the user. In the case of a phishing attack that directs the user to send a message (e.g., an email) with personal information, the detection module 220 for the messaging application 210 can also determine whether the user is attempting to send a message to a suspected or known fraudulent or phishing domain (e.g., phishing Web site 208), and/or can determine whether such a message has been sent. Ideally, the user can be warned before sending a message, but in some cases, a deceptive message may not be detected until after the user has sent a response.

The detection module 220 can detect a deceptive, fraudulent, or phishing email by examining the message content to determine a context of the email message, such as whether the message includes reference(s) to security, personal, and/or financial information. Further, a message can be examined to detect or determine whether it contains a suspicious URL, is likely to confuse a user, or is usually emailed out as spam to multiple recipients.

A user can also be warned of suspected phishing activity when replying to a suspicious or known fraudulent email message, or when sending an email communication to a suspected or known fraudulent address. The user can be warned directly at the client device 204, and/or if detection occurs at least in part at a data center 202 and/or at an associated email server, then data center 202 (and/or the associated email server) can send a warning message to a mailbox of the user with an indication as to why a particular email message is suspected of being deceptive or fraudulent.

Conventional anti-phishing tools simply indicate to a user that a message is fraudulent or not fraudulent. However, in many cases, an indicator can be suspicious without being definitive. Descriptive warning messages allow for more aggressive detection, and are intended to provide sufficient information so that a user can use his or her knowledge and judgment about a likely fraudulent email. For example, a user can be warned with messages such as "Warning: this message is from Districbank-Security.com, which, to the best of our knowledge, is not affiliated with Districbank.com. Please use caution if a message requests information about a DistricBank account", or "Warning: Note that this message is from DistricBanc.com and is not affiliated or from DistricBank.com. Please use caution if this message requests information about a DistricBank account." In this example, the warning message emphasizes the domain differences for the user by underlining the altered letters to indicate the likelihood of confusion. Any other form(s) of emphasis, such as "bold" or a "highlight", can also be utilized to emphasize a warning message.

A user can also be warned about specific user-selectable navigation links in an email message. For example, an IP (Internet Protocol) address may be included in an email rather than a domain name because the domain name would have to be registered, and is likely traceable to the phisher that registered the domain name. A user can be warned when clicking on an IP address link included in an email message with a warning such as "Warning: the link you clicked on is an IP address. This kind of link is often used by phishing scams. Be cautious if a Web page asks you for any personal or financial information." This type of warning provides a user with enough information to make an informed decision rather than relying on a simple "yes" or "no" from a phishing tool that does not provide sufficient information as to the reason(s) for the decision.

The detection module 220 can be implemented to detect various deceptive and/or fraudulent aspects of messages, such as emails. An example is a mismatch of the link text and the URL corresponding to a phishing Web site that a user is being requested, or enticed, to visit. A Web site link can appear as http://www.DistricBank.com/security having the link text "DistricBank", but which directs a user to a Web site, "StealYourMoney.com". Another common deception is a misuse of the "@" symbol in a URL. For example, a URL http://www.DistricBank.com@stealyourmoney.com directs a user to a Web site "StealYourMoney.com", and not to "DistricBank.com".

The detection module 220 can also be implemented to detect a URL that has been encoded to obfuscate the URL. For example, hexadecimal representations can be substituted for other characters in a URL such that DistricB%41nk.com is equivalent to DistricBank.com, and such that DictricBanc.com.%41%42%43%44evil.com is equivalent to the URL DistricBanc.com.abcdevil.com, although some users may not notice the part of the URL after the first ".com". Some character representations are expected, such as an "_" (underscore), "~" (tilde), or other character that may be encoded in a URL for a legitimate reason. However, encoding an alphabetic, numeric, or similar character may be detected as fraudulent, and detection module 220 can be implemented to initiate a warning to a user that indicates why a particular selectable link, URL, or email address is likely fraudulent.

Detectable features of deceptive or fraudulent phishing emails include one or more of an improper use of the "@" symbol, use of deceptive encoding, use of an IP address selectable link, use of a redirector, a mismatch between link text and the URL, and/or any combination thereof. Other detectable features of deceptive or fraudulent phishing include deceptive requests for personal information and suspicious words or groups of words, having a resemblance to a known fraudulent URL, a resemblance to a known phishing target in the title bar of a Web page, and/or any one of a suspicious message recipient, sender address, or display name in a message or email. A typical "From" line in an email is of the form: "From: "My Name" myname@example.com", and the portion "My Name" is called the "Display Name" and is typically displayed to a user. A phisher might send email: "From: "Security@DistricBank.com" badguy@stealmoney.com", which may pass anti-spoofing checks if "stealmoney.com" has anti-spoofing technology installed (since the email is not spoofed), and which might fool users because of the display name information.

The detection module 220 can also be implemented to compute an edit distance to determine the similarity between two strings. Edit distance is the number of insertions, deletions, and substitutions that would be required to transform one string to another. For example, Disttricbnc.com has an edit distance of three (3) from DistricBank.com because it would require one deletion (t), one insertion (a), and one substitution (k for c) to change Disttricbnc.com to DistricBank.com. A "human-centered" edit distance can be factored into detection module 220 that includes less of an emphasis for some changes, such as for "c" to "k" and for the number "1" for the lower-case L-letter "l". Other emphasis factors can include doubling or undoubling letters (e.g., "tt" changed to "t") as well as for certain wholesale changes such as ".com" changed to ".net", or for other changes that are not likely to be noticed by a user, such as "Distric" changed to "District". Additionally, the safe-list 224 of known false positives can be maintained for legitimate domains that may otherwise be detected as fraudulent domains. For instance, it might be the case that DistricBank.com is a large, legitimate bank and often a target of phishers, while DistricBanc.com is a small, yet legitimate bank. It is important not to warn all users of DistricBanc.com that their email appears to be fraudulent, and safe-listing is one example implementation to solve this.

The detection module 220 can be implemented to detect fraudulent messages through the presence of links containing at least one of an IP address, an "@" symbol, or suspicious HTML encoding. Other detectable features or aspects include whether an email message fails SenderID or another anti-spoofing technology. The SenderID protocol is implemented to authenticate the sender of an email and attempts to identify an email sender in an effort to detect spoofed emails. A Domain Name System (DNS) server maintains records for network domains, and when an email is received by an inbound mail server, the server can look up the published DNS record of the domain from which the email is originated to determine whether an IP (Internet protocol) address of a service provider corresponding to the domain matches a network domain on record. An email with a spoofed (or faked) "From:" address, as detected by the SenderID protocol or other anti-spoofing protocol, is especially suspicious although there may be legitimate reasons as to why this sometimes happens. Email with a spoofed sender ID protocol is sometimes deleted, placed in a junk folder, or bounced, but may also be delivered by some systems. The detection of spoofing can be implemented as an additional input to an anti-phishing system.

The detection module 220 can also be implemented to detect other fraudulent or deceptive features or aspects of a message, such as whether an email contains content known to be associated with phishing; is from a domain that does not provide anti-spoofing information; is from a newly established domain (i.e., phishing sites tend to be new); contains links to, or is a Web page in a domain that provides only a small amount of content when the domain is indexed; contains links to, or is a Web page in a domain with a low search engine score or static rank (or similar search engine query independent ranking score. Typically, a low static rank means that there are not many Web links to the Web page which is typical of phishing pages, and not typical of large legitimate sites); and/or whether the Web page is hosted via a Cable, DSL, or dialup communication link.

The detection module 220 can also be implemented to detect that data being requested in an email or other type of message is personal identifying information, such as if the text of the message includes words or groups of words like "credit card number", "Visa", "MasterCard", "expiration", "social security", and the like. Further, the detection module 220 can be implemented to detect that data being submitted by a user is in the form of a credit card number, or matches data known to be personal identifying information, such as the last four digits of a social security number. In an embodiment, only a portion or hash of a user's social security number, credit card number, or other sensitive data can be stored so that if the computer is infected by spyware, the user's personal data can not be easily stolen.

The detection module 220 can also be implemented to utilize historical data pertaining to domains that have been in existence for a determinable duration, and have not historically been associated with phishing or fraudulent activities. The detection module 220 can also include location dependent phishing lists and/or whitelists. For example, "Westpac" is a large Australian-based bank, but there may not be a perceptible need to warn U.S. users about suspected phishing attacks on "Western Pacific University". The detection implementation of the detection modules 220 can be more aggressive by implementing location and/or language dependent exclusions.

Methods for phishing detection, prevention, and notification are described with reference to FIGS. 3, 5, 7, 8, and 9, and may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices. In addition, any one or more method blocks described with reference to one of the methods described herein can be combined with any one or more method blocks described with reference to any other of the methods to implement various embodiments of phishing detection, prevention, and notification.

Figure 3:
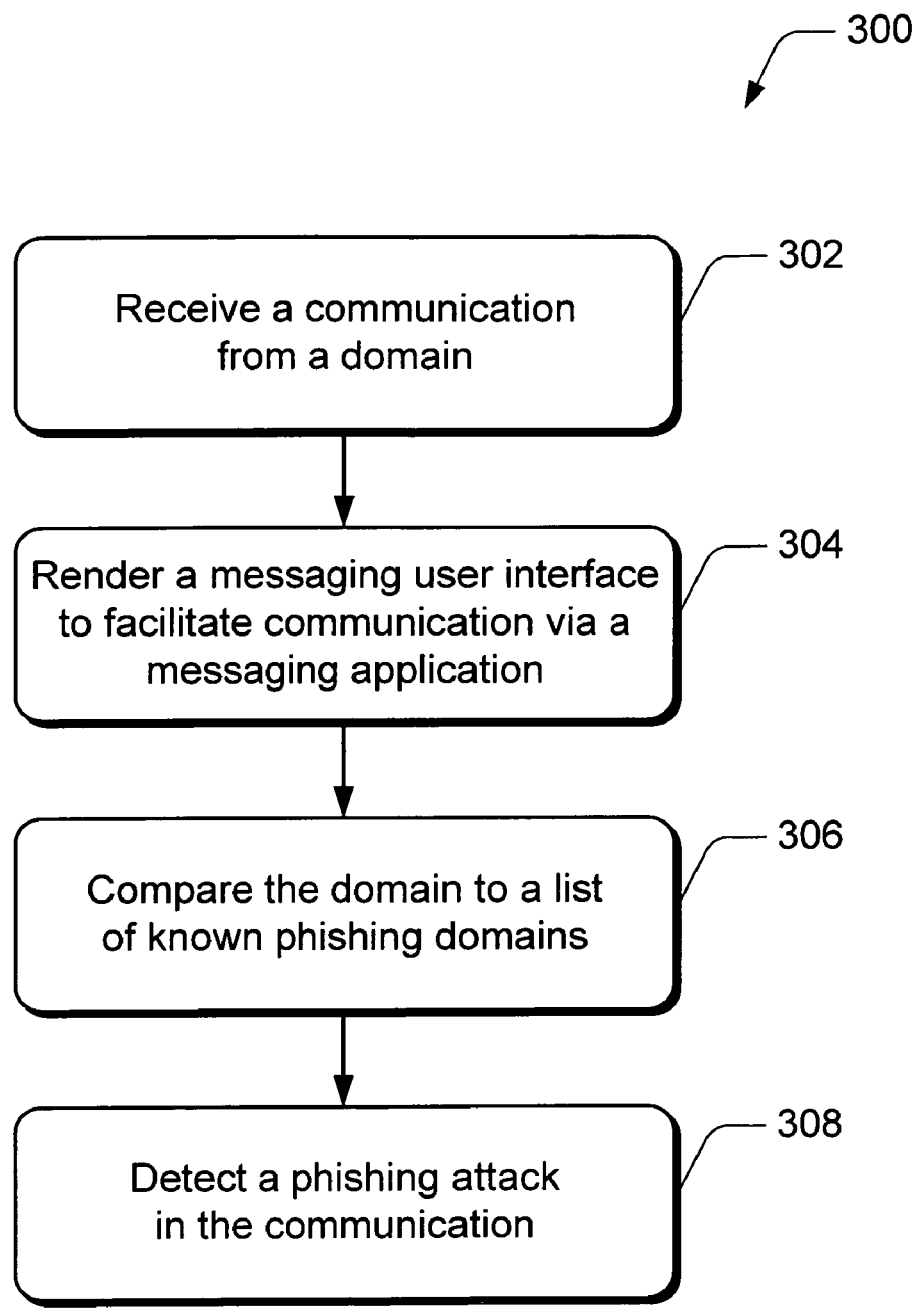
FIG. 3 is a flow diagram that illustrates an exemplary method for phishing detection, prevention, and notification as it pertains generally to messaging.

FIG. 3 illustrates an exemplary method 300 for phishing email detection, prevention, and notification and is described with reference to the exemplary messaging system shown in FIG. 2. The order in which the method is described is not intended to be construed as a limitation, and any number of the described method blocks can be combined in any order to implement the method. Furthermore, the method can be implemented in any suitable hardware, software, firmware, or combination thereof.

At block 302, a communication is received from a domain. For example, messaging application 210 receives an email message from a domain, such as the phishing Web site 208. At block 304, a messaging user interface is rendered to facilitate communication via a messaging application. For example, a messaging application 210 generates a messaging user interface (e.g., email application user interface 108 shown in FIG. 1) such that a user at client device 204 can communicate via email or other similar messaging applications.

At block 306, each domain in the communication is compared to a list of known phishing domains to determine whether the communication is a phishing communication, based in part on the "From" domain of the message compared to known phishing email senders and known phishing victims, links in the communication, email addresses in the communication, and/or based on the content of the message. Several domains can be found in a communication or message. These include the domain that the communication (e.g., email) is allegedly from, any specified reply-to domain (which may be different than the from domain), domains listed in a display name, domains in the text of the message, domains in links in the message, and domains in email addresses in the message. For example, detection module 220 compares the domain corresponding to the phishing Web site 208 to the list of known phishing domains 222 or cached list 226 of known phishing domains.

At block 308, a phishing attack is detected in the communication at least in part by determining that a domain in the communication is similar to a known phishing domain. For example, the detection module 220 determines that the domain corresponding to the phishing Web site 208 is similar or included in the list of known phishing domains 222 which is detected as a phishing attack. A known phishing domain can either be a domain known to be used by phishers (e.g., "DistricBank.biz", or a known, legitimate domain targeted by phishers, such as "DistricBank.com"). For example, a "From" domain (which is easily faked) of "DistricBank.com" combined with a link to "DistricBank.biz" would be highly suspicious.

The phishing attack can also be detected by the detection module 220 when a name of the domain is similar in edit-distance to the known phishing domain, and/or when the edit-distance is based at least in part on the likelihood of user confusion, or based at least in part on a site-specific change. The phishing attack can be detected as a user-selectable link within the received communication where the user-selectable link includes an IP (Internet protocol) address, an "@" sign, and/or suspicious HTML (Hypertext Markup Language) encoding. The phishing attack can also be detected if the communication fails anti-spoofing detection, contains suspicious text content, is received from the domain which does not provide anti-spoofing information, contains a user-selectable link to a minimal amount of content, and/or is received via at least one of a dial-up, cable, or DSL (Digital Subscriber Line) communication link.

The phishing attack can also be detected by the detection module 220 if the communication is received from a new domain, and/or if the content includes a user-selectable link to a Web-based resource. The phishing attack can also be detected when an IP (Internet protocol) address corresponding to the domain does not match the country where the domain is located. The phishing attack can also be detected if the communication includes a user-selectable link which includes link text and a mismatched URL (Uniform Resource Locator). If the received communication is an email message, the detection module 220 can examine data and/or a name in a "From" field of the email to detect the phishing attack. In an event that an email is communicated from messaging application 210, the detection module 220 can detect a phishing attack by examining data in a "To" field of the email, a "CC" (carbon copy) field of the email, and/or a "BCC" (blind carbon copy) field of the email.

Figure 4:
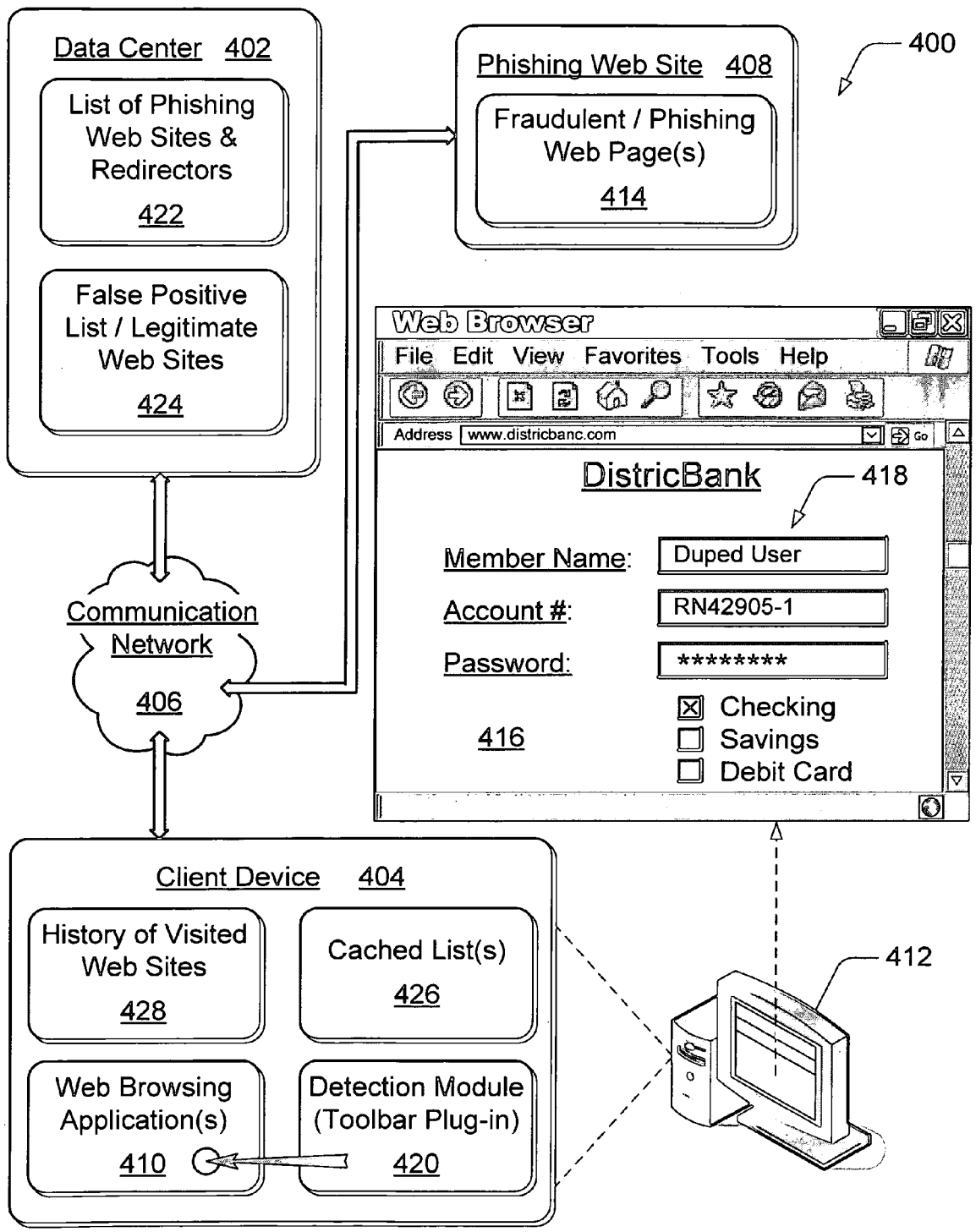
FIG. 4 illustrates an exemplary Web browsing system in which embodiments of phishing detection, prevention, and notification can be implemented.

FIG. 4 illustrates an exemplary Web browsing system 400 in which embodiments of phishing detection, prevention, and notification can be implemented. The system 400 includes a data center 402 and a client device 404 configured for communication with data center 402 via a communication network 406. The system 400 also includes a phishing Web site 408 connected via the communication network 406 to the data center 402 and/or to the client device 404.

In an embodiment, data center 402 can be implemented as server device 102 shown in FIG. 1, any number of the client devices 104(1-N) can be implemented as client device 404, and computing device 124 can be implemented as phishing Web site 408. The data center 402 and/or client device 404 may be implemented as any form of computing or electronic device with any number and combination of differing components as described below with reference to the exemplary computing device 600 shown in FIG. 6, and with reference to the exemplary computing environment 1000 shown in FIG. 10.

The client device 404 is an example of a Web browsing client that includes Web browsing application(s) 410 to generate a Web browser user interface (e.g., Web browser user interface 110) for display on a display device 412. In this example, a user browsing the Web at client device 404 may be enticed (e.g., when receiving a phishing email) to navigate to a fraudulent or phishing Web page 414 hosted at the phishing Web site 408. The phishing Web page is rendered on display 412 at client device 404 as Web page 416 which is a user-interactive form through which the unsuspecting user might enter personal and/or financial information, such as bank account information 418. The phishing Web page 416 may also be deceptive in that a user intended to navigate to his or her bank, "DistricBank" as indicated on the Web page 416, when in fact the unsuspecting user has been directed to a fraudulent, phishing Web page as indicated by the address "www.districbanc.com".

The phishing Web page 416 contains an interactive form that includes various information fields that can be filled-in with user specific, private information via interaction with data input devices at client device 404. Form 416 includes information fields 418 for a bank member's name, account number, and a password, as well as several selectable fields that identify the type of banking accounts associated with the user. When a user interacts with the phishing Web page 416 via client device 404, a phisher can capture the personal and/or financial information 418 corresponding to the user and then use the information for monetary gain at the user's expense.

Client device 404 includes a detection module 420 that can be implemented as a browsing toolbar plug-in for a Web browsing application 410 to implement phishing detection, prevention, and notification. The detection module 420 can be implemented as any one or combination of hardware, software, firmware, code, and/or logic in an embodiment of phishing detection, prevention, and notification. Although detection module 420 for the Web browsing application 410 is illustrated and described as a single module or application, the detection module 420 can be implemented as several component applications distributed to each perform one or more functions of phishing detection, prevention, and notification.

Detection module 420 can also be implemented as an integrated component of a Web browsing application 410, rather than as a toolbar plug-in module. The detection module 420 can include algorithm(s) for the detection of fraudulent and/or deceptive phishing Web sites and domains. The algorithms can be generated and/or updated at the data center 402, and then distributed to the client device 404 as an update to the detection module 420.

Detection module 420 associated with a Web browsing application 410 is implemented to detect phishing when a user interacts with the Web browsing application 410 through a Web browsing user interface (e.g., Web browser user interface 110 shown in FIG. 1). Detection module 420 associated with the Web browsing application 410 implements features for phishing detection, prevention, and notification of fraudulent, deceptive, and/or phishing Web sites.

Data center 402 maintains a list of known phishing Web sites and redirectors 422, as well as a false positive list 424 (or a whitelist) of known legitimate Web sites that have been deemed safe for user interaction. The list of known phishing Web sites 422 includes a list of known bad URLs (e.g., URLs associated with phishing Web sites) and a list of ancestors of the known bad URLs. The data center 402 publishes the list of known phishing Web sites and redirectors 422 to the client device 404 which maintains the list as a cached list 426 of the known phishing Web sites. Alternatively, and/or in addition, the client device 404 can query the data center 402 about each URL the user visits, and cache the results of the queries. In some instances, a user may navigate to a phishing Web site 408 before the list of known phishing Web sites 422 is updated at data center 402 to include the phishing Web site 408, and before the list is published to the client device 404.

The client device 404 includes a history of visited Web sites 428 which would indicate that a user interacting through client device 404 has navigated to phishing Web site 408. After the list of known phishing Web sites 422 is updated at the data center 402 and/or after the data center 402 publishes the list of known phishing Web sites 422 to the client device 404, the history of visited Web sites 428 can be compared to the list of known phishing Web sites 422 and/or to the cached list 426 of the known phishing Web sites to determine whether the user has unknowingly visited the phishing Web site 408.

If it is determined after the fact that a user has visited a phishing Web site, a warning message can be displayed to inform the user that the phishing Web site (or suspected phishing Web site) has been visited. The user can then make an informed decision about what to do next, such as if the user provided any personal or financial information while at the phishing Web site. This can give the user time to notify his or her bank, or other related business, of the information disclosure and thus preclude fraudulent use of the information that may result from the disclosure of the private information. Additionally, the detection module 420 can determine for the user whether the private information and/or other data was submitted, such as through an HTML form, and then warn the user if the private information was actually submitted rather than the user just visiting the phishing Web site.

Detection module 420 can query or access the cached list 426 of known phishing Web sites maintained at client device 404, communicate a query to data center 402 to determine if a Web site is a phishing Web site from the list of known phishing Web sites 422, or both. This can be implemented either by explicitly storing the user's history of visited Web sites 428, or by using the history already stored by a Web browsing application 410. A Web browsing application 410 can compare the history of visited Web sites 428 to the updated cached list 426 of known phishing Web sites. Alternatively, or in addition, the Web browsing application 410 can periodically communicate the list of recently visited Web sites to poll an on-line phishing check at data center 402.

A user can be warned of a suspected phishing Web site, such as when Web page 416 is rendered for user interaction. A user can be warned with messages such as "Warning: this Web site contains an address name for "districbanc.com", which, to the best of our knowledge, is not affiliated with "Districbank". Please use caution if submitting any personal or financial information about a DistricBank account."

A user can also be warned about specific user-selectable navigation links in a Web page. For example, an IP (Internet Protocol) address may be included in a Web page rather than a domain name because the domain name would have to be registered, and is likely traceable to the phisher that registered the domain name. A user can be warned when clicking on an IP address link included on a Web page with a warning such as "Warning: the link you clicked on is an IP address. This kind of link is often used by phishing scams. Be cautious if the Web page asks you for any personal or financial information." IP address links are often used in fraudulent email, but may also be used in legitimate email. Simply blocking or allowing the user to visit a site does not provide the user with enough information to consistently make the correct decision. As such, informing the user of the reason(s) for suspicion provides a user with enough information to make an informed decision.

The detection module 420 can be implemented to detect various deceptive and/or fraudulent aspects of Web pages. An example is a mismatch of the link text and the URL corresponding to a phishing Web site that a user is being requested, or enticed, to visit. A Web site link can appear as http://www.DistricBank.com/security having the link text "DistricBank", but which directs a user to a Web site, "StealYourMoney.com". Another common deception is a misuse of the "@" symbol in a URL. For example, a URL http://www.DistricBank.com@stealyourmoney.com directs a user to a Web site "StealYourMoney.com", and not to "DistricBank.com".

The detection module 420 can also be implemented to detect a redirector which is a URL that redirects a user from a first Web site to another Web site. For example, http://www.WebSite.com/redirect?http://StealMoney.com first directs a user to "WebSite.com", and then automatically redirects the user to "StealMoney.com". Typically, a redirector includes two domains (e.g. "WebSite.com" and "StealMoney.com" in this example), and will likely include an embedded "http://". Redirectors are also used for legitimate reasons, such as to monitor click-through rates on advertising. As such, if a redirected site is included in a link (e.g., "StealMoney.com" in this example), the redirected site can be compared to the list of known or suspected phishing sites 422 maintained at data center 402.

The detection module 420 can also be implemented to detect a URL that has been encoded to obfuscate the URL. For example, hexadecimal representations can be substituted for other characters in a URL such that DistricB%41nk.com is equivalent to DistricBank.com. Some character representations are expected, such as an "_" (underscore), "~" (tilde), or other character that may be encoded in a URL for a legitimate reason. However, encoding an alphabetic, numeric, or similar character may be detected as fraudulent, and detection module 420 can be implemented to initiate a warning to a user that indicates why a particular selectable link, URL, or email address is likely fraudulent.

Detectable features of deceptive or fraudulent phishing include one or more of an improper use of the "@" symbol, use of deceptive encoding, use of an IP address selectable link, use of a redirector, a mismatch between link text and the URL, and/or any combination thereof. Other detectable features of deceptive or fraudulent phishing include deceptive requests for personal information and suspicious words or groups of words, having a resemblance to a known fraudulent URL, and/or a resemblance to a known phishing target in the title bar of a Web page.

The detection module 420 can also be implemented to detect an edit distance to determine the similarity between two strings. Edit distance is the number of insertions, deletions, and substitutions that would be required to conform one string to another. For example, Disttricbnc.com has an edit distance of three (3) from DistricBank.com because it would require one deletion (t), one insertion (a), and one substitution (k for c) to change Disttricbnc.com to DistricBank.com. A "human-centered" edit distance can be factored into detection module 420 that includes less of an emphasis for some changes, such as for "c" to "k" and/or the number "1" changed for the lower-case L-letter "l". Other emphasis factors can include doubling or undoubling letters (e.g., "tt" changed to "t") as well as for certain wholesale changes such as ".com" changed to ".net", or "Distric" changed to "District". Additionally, a safe-list of known false positives can be maintained for legitimate domains that may otherwise be detected as fraudulent domains.

The detection module 420 can also be implemented to detect other fraudulent or deceptive features or aspects of a phishing Web page, such as whether a Web page contains content known to be associated with phishing; is from a newly established domain (i.e., phishing sites tend to be new); is from a domain that is seldom visited (has low traffic); is from a domain hosted by a Web hosting site; contains links to, or is a Web page in a domain that provides only a small amount of content when the domain is indexed; contains links to, or is a Web page in a domain with a low search engine score or static rank (e.g., there are not many Web links to the Web page); and/or whether the Web page is hosted via a Cable, DSL, or dialup communication link.

The detection module 420 for a Web browsing application 410 can be implemented to detect other features or aspects that may indicate a phishing Web page, such as whether the Web page contains an obscured form field; has a form field name that does not match what is posted on the page; has a form field name that is not discernable by a user, such as due to font size and/or color; has a URL that includes control characters (i.e., those with ASCII codes between zero and thirty-one (0-31)); has a URL that includes unwise character encodings (e.g., encodings in the path or authority section of a URL are typically unwise); includes HTML character encoding techniques in a URL (e.g., includes a "&#xx" notation where "xx" is an ASCII code); has a URL that includes an IP version six address; and/or has a URL that includes a space character which can be exploited.

A fraudulent, deceptive, or phishing Web page often includes content, such as images and text, from a legitimate Web site. To reduce bandwidth or for simplicity, a phishing Web page may be developed using pointers to images on a Web page at a legitimate Web site. It may also open windows or use frames to directly display content from the legitimate site. User-selectable links to legitimate Web pages may also be included, such as a link to a privacy policy at a legitimate Web site. The detection module 420 can be implemented to detect a fraudulent, deceptive, or phishing Web page that includes a large number of links to one other legitimate Web site, and particularly to a Web site that is commonly spoofed, and which includes another selectable link that points to a different Web site, or contains a form that sends data to a different Web site.

The detection module 420 can also be implemented to detect that the data being requested via a Web page is personal identifying information, such as if the Web page includes words or groups of words like "credit card number", "Visa", "MasterCard", "expiration", "social security", and the like, or if the form that collects the data contains a password-type field. Further, the detection module 420 can be implemented to detect that data being submitted by a user is in the form of a credit card number, or matches data known to be personal identifying information, such as the last four digits of a social security number, or is likely an account number, for example, if the data is many characters long and consists entirely of numbers and punctuation.

Detection module 420 for a Web browsing application 410 can also be implemented to detect that a Web page may be fraudulent if private information is requested, yet there is no provision for submitting the information via HTTPS (secure HTTP). A phisher may not be able to obtain an HTTPS certificate which is difficult to do anonymously, and will forgo the use of HTTPS to obtain the private information.

Detection module 420 can also be implemented to determine the country or IP range in which a Web server is located to further detect phishing Web sites on the basis of historical phishing behavior of that country or IP range. This can be accomplished using any one or more of the associated IP information, Whois information (e.g., to identify the owner of a second-level domain name), and Traceroute information. The location of a user can be determined from an IP address, registration information, configuration information, and/or version information. The detection module 420 for a Web browsing application 410 can also be implemented to utilize historical data pertaining to domains and/or Web pages that have been in existence for a determinable duration, and have not historically been associated with phishing or fraudulent activities.

Figure 5:
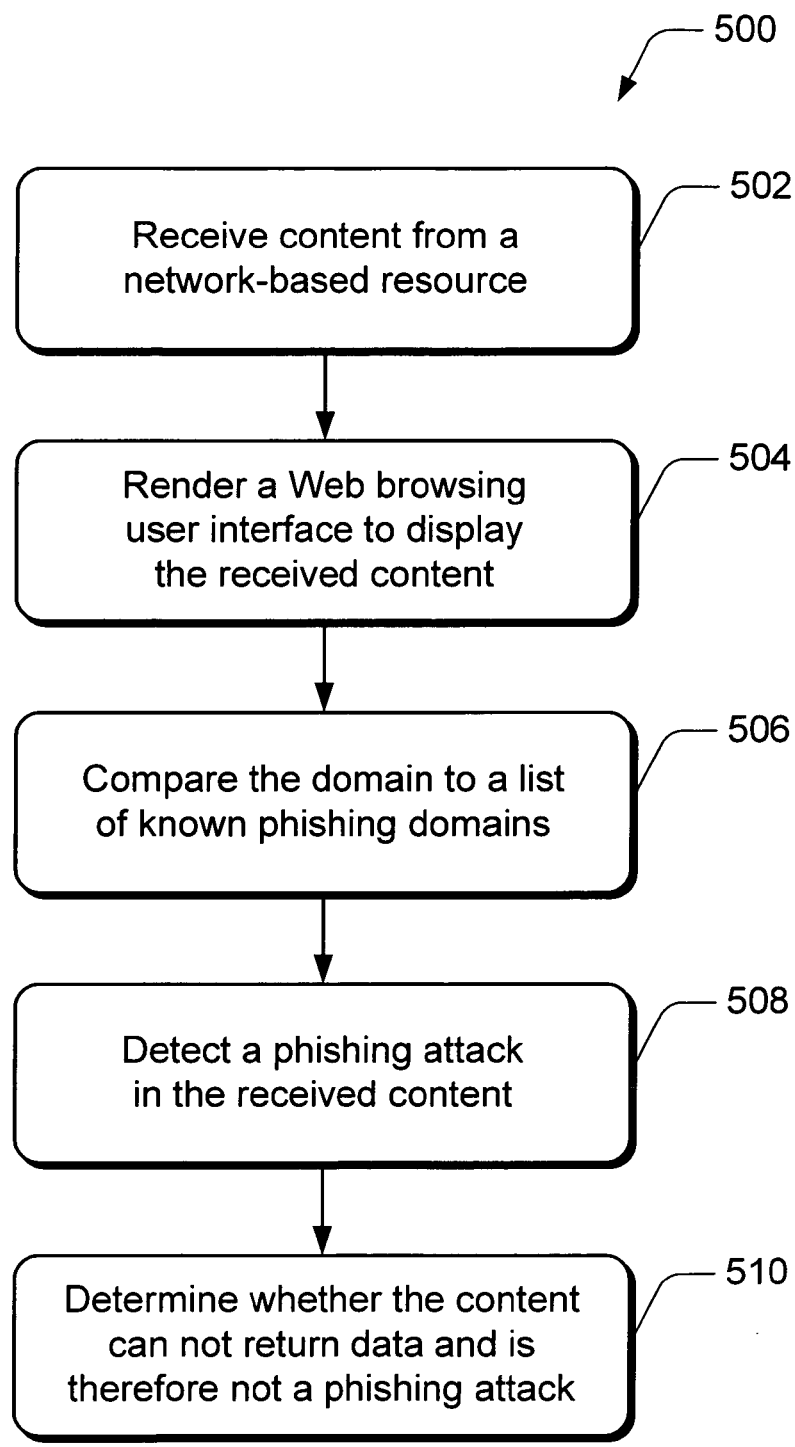
FIG. 5 is a flow diagram that illustrates an exemplary method for phishing detection, prevention, and notification as it pertains generally to Web browsing.

FIG. 5 illustrates an exemplary method 500 for phishing detection, prevention, and notification and is described with reference to the exemplary Web browsing system shown in FIG. 4. The order in which the method is described is not intended to be construed as a limitation, and any number of the described method blocks can be combined in any order to implement the method. Furthermore, the method can be implemented in any suitable hardware, software, firmware, or combination thereof.

At block 502, content is received from a network-based resource. For example, a Web browsing application 410 generates a Web browser user interface (e.g., Web browser user interface 110 shown in FIG. 1) such that a user at client device 404 can request and receive Web pages and other information from a network-based resource, such as a Web site or domain. At block 504, a user interface of a Web browsing application is rendered to display the content received from the network-based resource.

At block 506, the domain is compared to a list of known phishing domains. For example, detection module 420 compares the domain corresponding to the phishing Web site 408 to the list of known phishing Web sites 422 or cached list 426 of known phishing Web sites. The list of known phishing domains can be based on historical data corresponding to the known phishing domains. The domain can also be compared to a list of false positive domains and/or a whitelist to determine that the domain is not a phishing domain.

At block 508, a phishing attack is detected in the content at least in part by determining that a domain of the network-based resource is similar to a known phishing domain. For example, the detection module 420 determines that the domain corresponding to the phishing Web site 408 is similar or included in the list of known phishing Web sites 422 which is detected as a phishing attack.

The phishing attack can also be detected by the detection module 420 when a name of the domain is similar in edit-distance to the known phishing victim domain, and/or when the edit-distance is based at least in part on the likelihood of user confusion, or based at least in part on a site-specific change. The phishing attack can be detected as a user-selectable link within the received content where the user-selectable link includes an IP (Internet protocol) address, an "@" sign, and/or suspicious HTML (Hypertext Markup Language) encoding. The phishing attack can also be detected if the content contains suspicious text content, contains a user-selectable link to a minimal amount of content, and/or is received via at least one of a dial-up, cable, or DSL (Digital Subscriber Line) communication link.

The phishing attack can also be detected by the detection module 420 if the content is received from a network-based resource which is a new domain, if the Web page has a low static rank, and/or if the content includes multiple user-selectable links to an additional network-based resource, and is configured to submit form data to a network-based resource other than the additional network-based resource. At block 510, the phishing attack is determined not to be a phishing attack if the content can not return data to the domain, or to any other domain.

Figure 6:
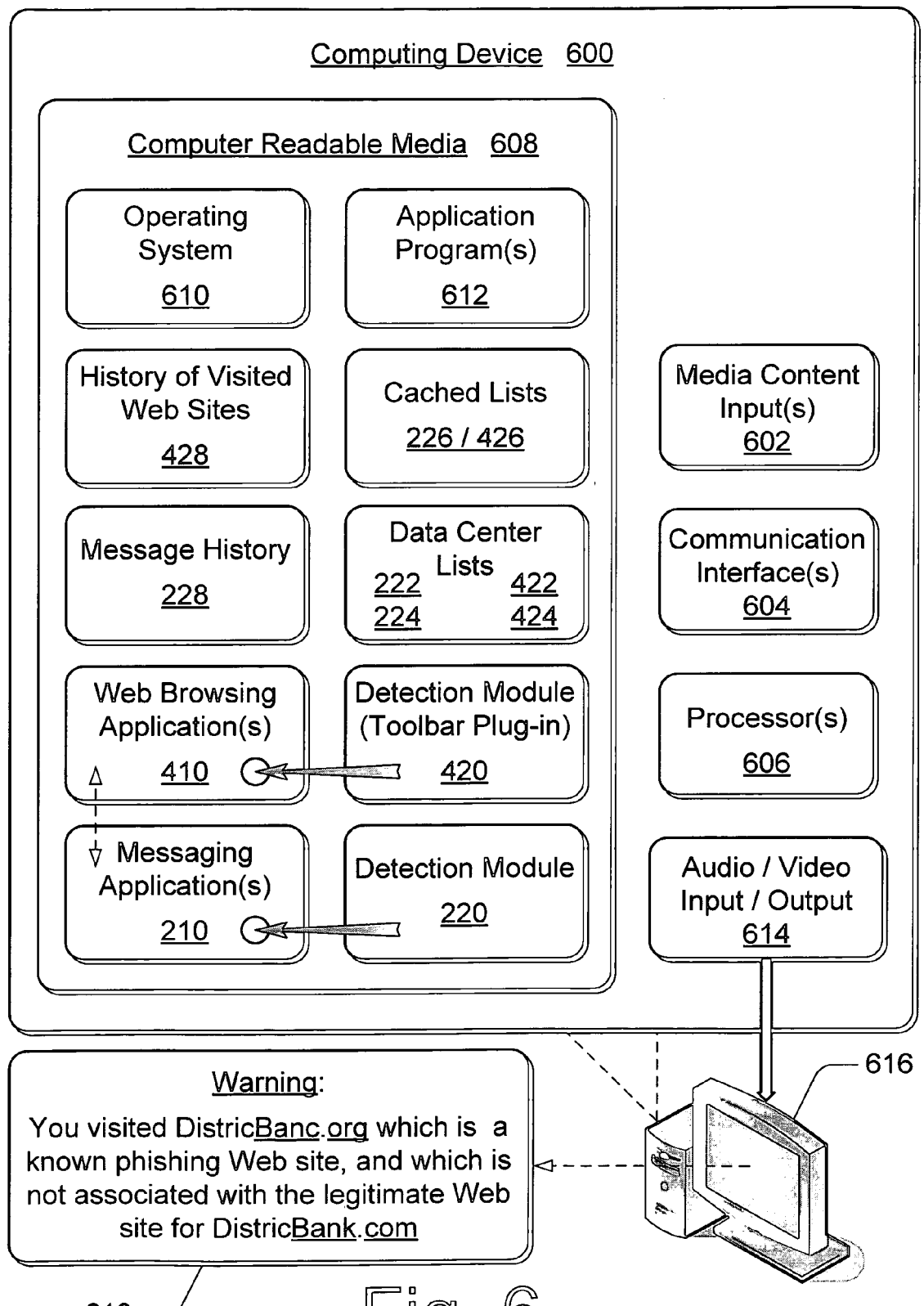
FIG. 6 illustrates an exemplary computing device that can be implemented as any one of the devices in the exemplary systems shown in FIGS. 1, 2, and 4.

FIG. 6 illustrates various components of an exemplary computing device 600 in which embodiments of phishing detection, prevention, and notification can be implemented. For example, any one of client devices 104(1-N) (FIG. 1), client devices 204 (FIG. 2) and 404 (FIG. 4), and data centers 202 (FIG. 2) and 402 (FIG. 4) can be implemented as computing device 600 in the respective exemplary systems 200 and 400. Computing device 400 can also be implemented as any form of computing or electronic device with any number and combination of differing components as described below with reference to the exemplary computing environment 1000 shown in FIG. 10.

The computing device 600 includes one or more media content inputs 602 which may include Internet Protocol (IP) inputs over which streams of media content are received via an IP-based network. Computing device 600 further includes communication interface(s) 604 which can be implemented as any one or more of a serial and/or parallel interface, a wireless interface, any type of network interface, and as any other type of communication interface. A wireless interface enables computing device 600 to receive control input commands and other information from an input device, and a network interface provides a connection between computing device 600 and a communication network (e.g., communication network 106 shown in FIG. 1) by which other electronic and computing devices can communicate data with computing device 600.

Computing device 600 also includes one or more processors 606 (e.g., any of microprocessors, controllers, and the like) which process various computer executable instructions to control the operation of computing device 600, to communicate with other electronic and computing devices, and to implement embodiments of phishing detection, prevention, and notification. Computing device 600 can be implemented with computer readable media 608, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 608 provides data storage mechanisms to store various information and/or data such as software applications and any other types of information and data related to operational aspects of computing device 600. For example, an operating system 610, various application programs 612, the Web browsing application(s) 410, the messaging application(s) 210, and the detection modules 220 and 420 can be maintained as software applications with the computer readable media 608 and executed on processor(s) 606 to implement embodiments of phishing detection, prevention, and notification. In addition, the computer readable media 608 can be utilized to maintain the history of visited Web sites 428, the message history 228, and the cached lists 226 and 426 for the various client devices which can be implemented as computing device 600.

As shown in FIG. 6, a Web browsing application 410 and a messaging application 210 are configured to communicate to further implement various embodiments of phishing detection, prevention, and notification. The messaging application 210 can notify the Web browsing application 410 when Web-based content (e.g., a Web page) is requested via a selectable link within an email message. In one embodiment, the messaging application 210 (via detection module 220) may have detected or determined fraudulent or suspected phishing content in a message, and can communicate a notification to the Web browsing application 410. The detection modules 220 and/or 420 can warn a user to prevent fraud based at least in part on whether a user arrived at a current Web page directly or indirectly via an email message or other messaging system.

In an embodiment, the various application programs 612 can include a machine learning component to implement features of phishing detection, prevention, and notification. A detection module 220 and/or 420 can implement the machine learning component to determine whether a Web page or message is suspicious or contains phishing content. Inputs to a machine learning module can include the full text of a Web page, the subject line and body of an email message, any inputs that can be provided to a spam detector, and/or the title bar of the Web page. Additionally, the machine learning component can implemented with discriminative training.

Computing device 600 also includes audio and/or video input/outputs 614 that provide audio and/or video to an audio rendering and/or display device 616, or to other devices that process, display, and/or otherwise render audio, video, and display data. Video signals and audio signals can be communicated from computing device 600 to the display device 616 via an RF (radio frequency) link, S-video link, composite video link, component video link, analog audio connection, or other similar communication links. A warning message 618 can be generated for display on display device 616. The warning message 618 is merely exemplary, and any type of warning, be it text, graphic, audible, or any combination thereof, can be generated to warn a user of a possible phishing attack.

Although shown separately, some of the components of computing device 600 may be implemented in an application specific integrated circuit (ASIC). Additionally, a system bus (not shown) typically connects the various components within computing device 600. A system bus can be implemented as one or more of any of several types of bus structures, including a memory bus or memory controller, a peripheral bus, an accelerated graphics port, or a local bus using any of a variety of bus architectures.

Figure 7:
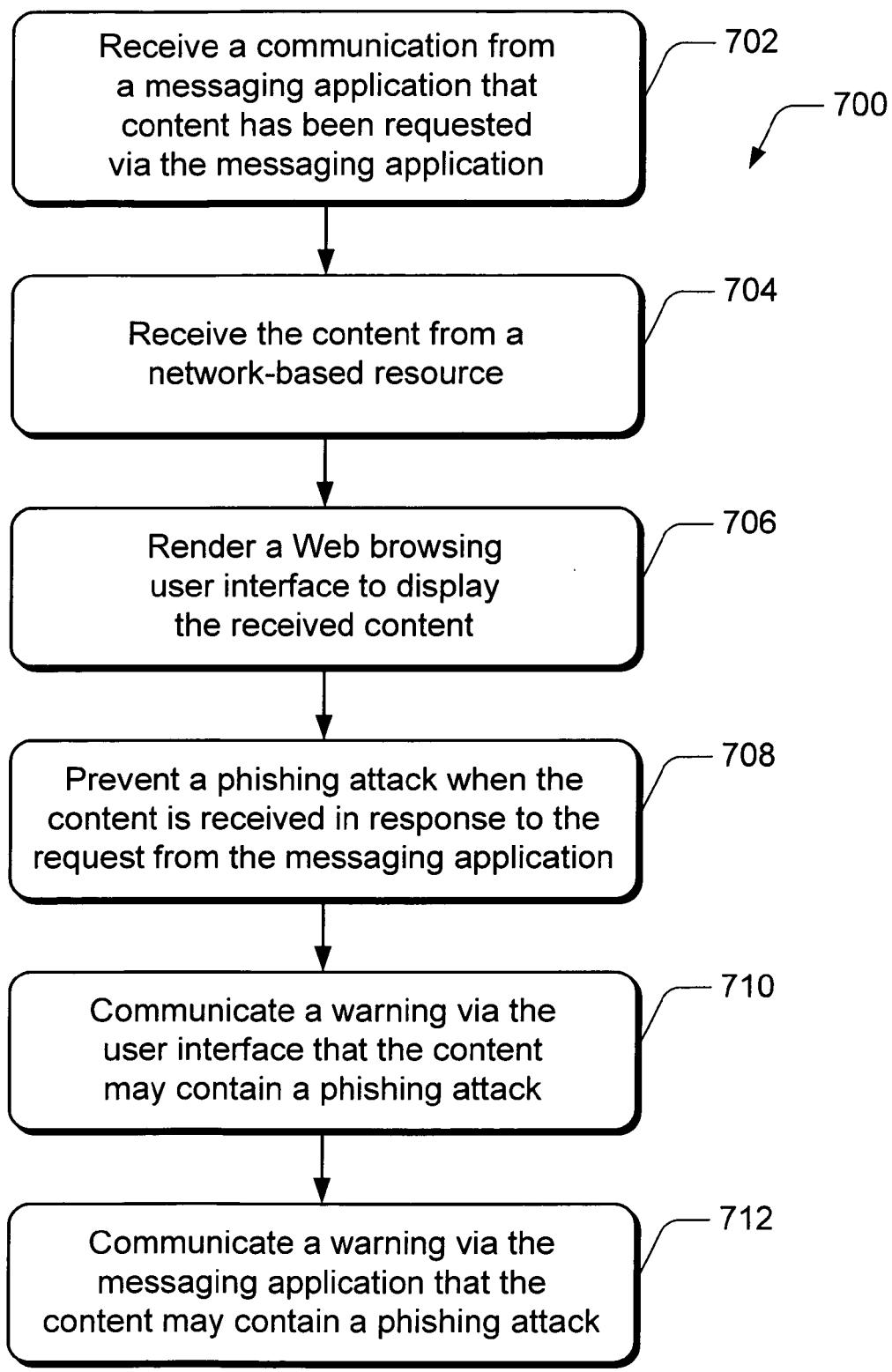
FIG. 7 is a flow diagram that illustrates another exemplary method for phishing detection, prevention, and notification.

FIG. 7 illustrates an exemplary method 700 for phishing detection, prevention, and notification. The order in which the method is described is not intended to be construed as a limitation, and any number of the described method blocks can be combined in any order to implement the method. Furthermore, the method can be implemented in any suitable hardware, software, firmware, or combination thereof.

At block 702, a communication is received from a messaging application that content has been requested via a messaging application. For example, a messaging application 210 (FIG. 2) can utilize a referring page, a URI (Uniform Resource Identifier), a Web browser switch, or a Web browser API (Application Program Interface) to communicate with the Web browsing application 410 that Web-based content has been requested via the messaging application 210.

At block 704, the content is received from a network-based resource. For example, Web browsing application 410 (FIG. 4) generates a Web browser user interface (e.g., Web browser user interface 110 shown in FIG. 1) such that a user at client device 404 can request and receive Web pages and other information from a network-based resource, such as a Web site or domain. At block 706, a user interface of a Web browsing application is rendered to display the content received from the network-based resource.

Typically, phishing attacks are conducted by a communication being received by a user instructing the user to visit a Web page. A user can arrive at web pages in many ways, such as from a favorites list, by searching the Internet, and the like, most of which do not typically precede browsing to a Web page that conducts a phishing attack. For a Web-browsing phishing detector, knowing that a Web page being viewed was reached via a messaging application is a feature of phishing detection, prevention, and notification. The Web pages not reached via a messaging application can either be presumed to be safe, or the degree of suspicion of a Web page can be reduced if the Web page was not reached via a messaging application.

In addition, a messaging application may have its own degree of suspicion of the originating message. For instance, an originating message that fails a SenderID check would be highly suspicious. An originating message from a trusted sender that passed a SenderID check might be considered safe. The messaging application can communicate its degree of suspicion or related information to a Web-browsing phishing detector. If the Web-browsing phishing detector then detects further suspicious indications, these can be used in combination with the communications from the messaging application to determine an appropriate course of action, such as warning that the content may contain a phishing attack.

At block 708, a phishing attack is prevented when the content is received from the network-based resource in response to a request for the content from the messaging application. For example, detection module 420 can determine that the request for the content originated from messaging application 410 via a referring page and a list of known Web-based email systems. A suspicion score may also be obtained from the messaging application where the suspicion score indicates a likelihood of a phishing attack. The phishing attack can also be prevented by combining the suspicion score with phishing information corresponding to the network-based resource to further determine the likelihood of the phishing attack.

At block 710, a warning is communicated to a user via the user interface that the content may contain a phishing attack. Alternatively and/or in addition at block 712, a warning is communicated to the user via the messaging application that the content may contain a phishing attack. For example, a warning can be rendered for viewing via a user interface display, or a warning can be communicated to a user as an email message, for example.

Figure 8:
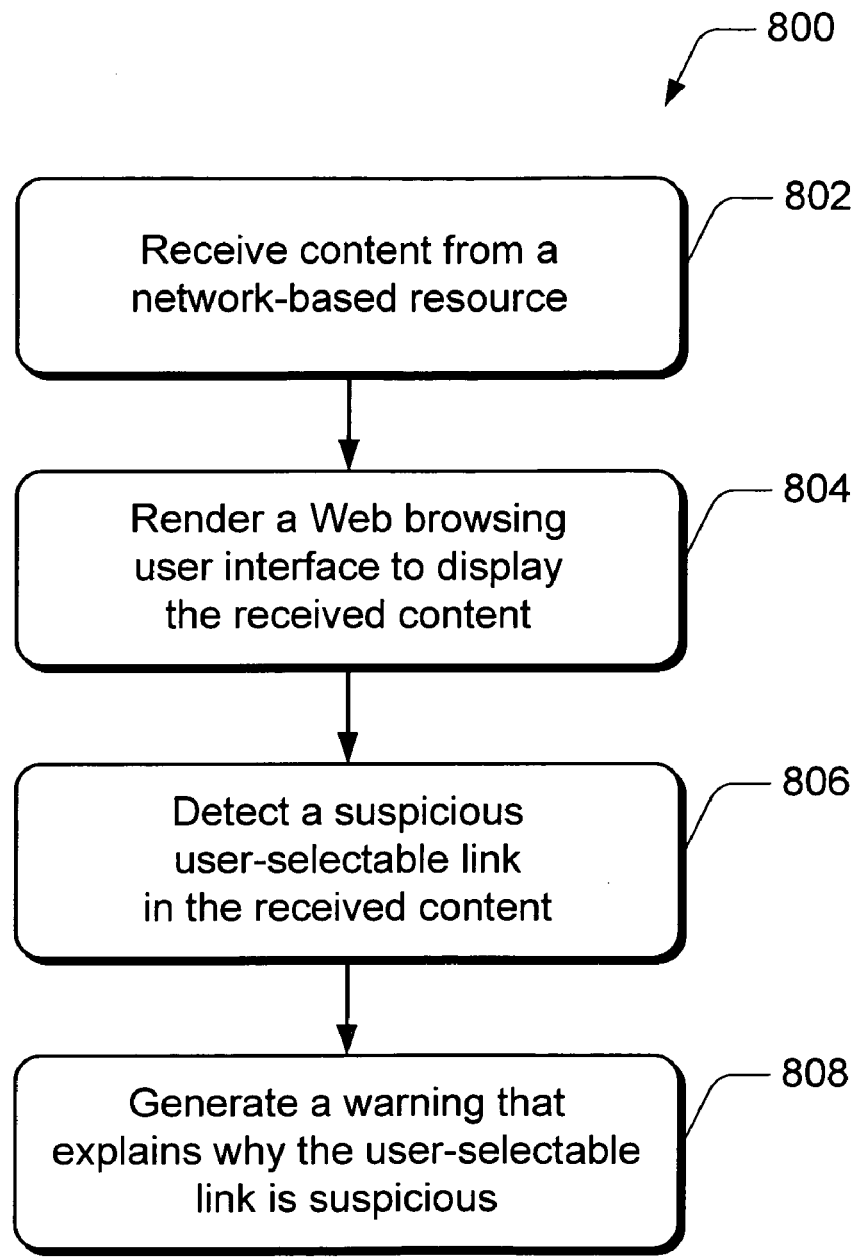
FIG. 8 is a flow diagram that illustrates another exemplary method for phishing detection, prevention, and notification.

FIG. 8 illustrates an exemplary method 800 for phishing detection, prevention, and notification. The order in which the method is described is not intended to be construed as a limitation, and any number of the described method blocks can be combined in any order to implement the method. Furthermore, the method can be implemented in any suitable hardware, software, firmware, or combination thereof.

At block 802, content is received from a network-based resource. For example, a Web browsing application 410 (FIG. 4) generates a Web browser user interface (e.g., Web browser user interface 110 shown in FIG. 1) such that a user at client device 404 can request and receive Web pages and other information from a network-based resource, such as a Web site or domain. At block 804, a user interface of a Web browsing application is rendered to display the content received from the network-based resource.

At block 806, a suspicious user-selectable link is detected in the content. For example, the detection module 420 (FIG. 4) can detect that a suspicious user-selectable link may be a link to an additional network-based resource, a URL (Uniform Resource Locator), and/or an email address. The user-selectable link can be detected as being similar to a known fraudulent target, as including suspicious text content, and/or including suspicious text content in a title bar of the user interface of the Web browsing application.

At block 808, a warning is generated that explains why the user-selectable link is suspicious. For example, the detection module 420 can initiate that a warning be generated to explain a difference between a valid user-selectable link and the suspicious user-selectable link. The warning can also be generated to explain that the user-selectable link includes an "@" sign, suspicious encoding, an IP (Internet Protocol) address, a redirector, and/or link text and a mismatched URL (Uniform Resource Locator).

Figure 9:
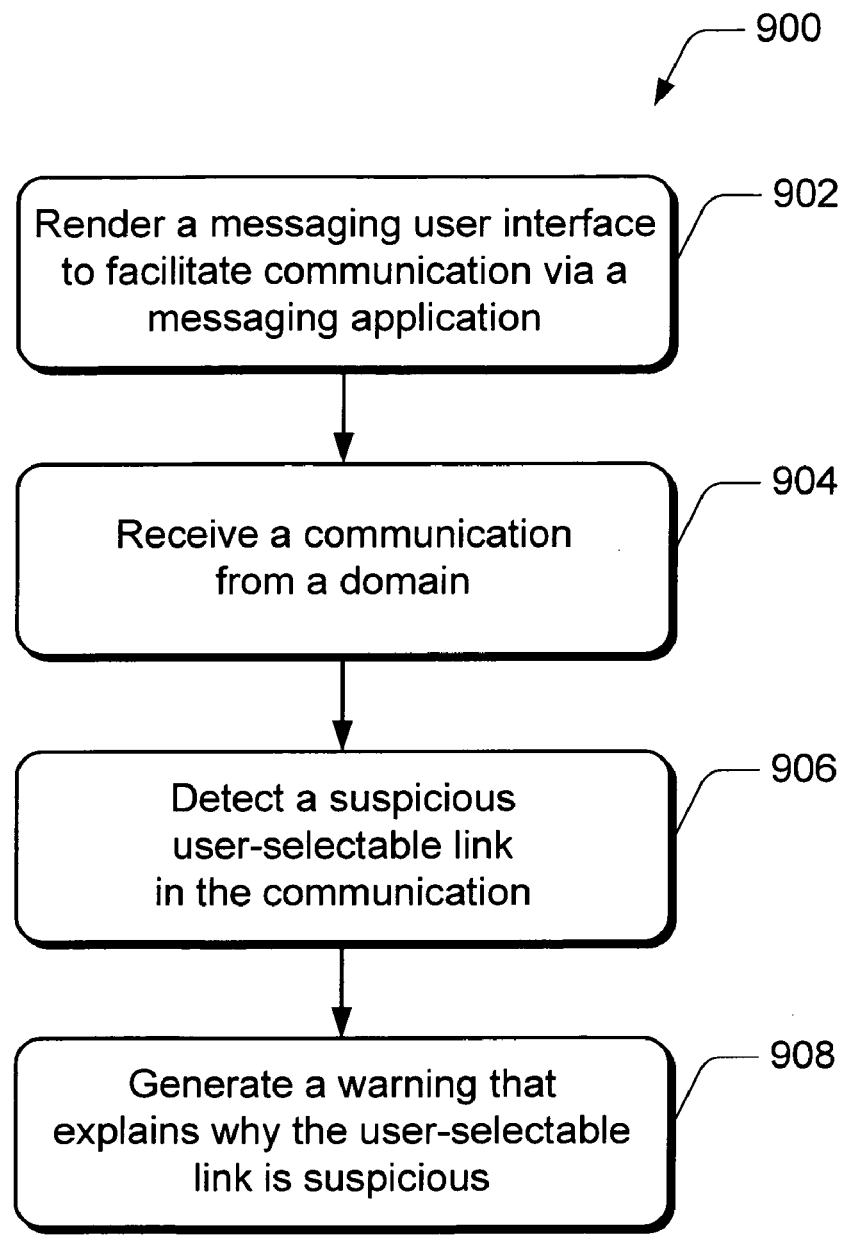
FIG. 9 is a flow diagram that illustrates another exemplary method for phishing detection, prevention, and notification.

FIG. 9 illustrates an exemplary method 900 for phishing detection, prevention, and notification and is described with reference to an exemplary client device and/or data center (e.g., server device), such as shown in FIGS. 2-3. The order in which the method is described is not intended to be construed as a limitation, and any number of the described method blocks can be combined in any order to implement the method. Furthermore, the method can be implemented in any suitable hardware, software, firmware, or combination thereof.

At block 902, a messaging user interface is rendered to facilitate communication via a messaging application. For example, a messaging application 210 generates a messaging user interface (e.g., email application user interface 108 shown in FIG. 1) such that a user at client device 204 can communicate via email or other similar messaging applications. At block 904, a communication is received from a domain. For example, messaging application 210 receives an email message from a domain, such as the phishing Web site 208.

At block 906, a suspicious user-selectable link is detected in the communication. For example, the detection module 220 (FIG. 2) can detect that a suspicious user-selectable link may be any one of a network-based resource, a URL (Uniform Resource Locator), and/or an email address. The user-selectable link can be detected as being similar to a known fraudulent target, or can be included as part of a suspicious sender address or display name.

At block 908, a warning is generated that explains why the user-selectable link is suspicious. For example, the detection module 220 can initiate that a warning be generated to explain a difference between a valid user-selectable link and the suspicious user-selectable link. Further, the warning can be generated to explain that the user-selectable link includes an "@" sign, suspicious encoding, an IP (Internet Protocol) address, a redirector, and/or link text and a mismatched URL (Uniform Resource Locator).

Figure 10:
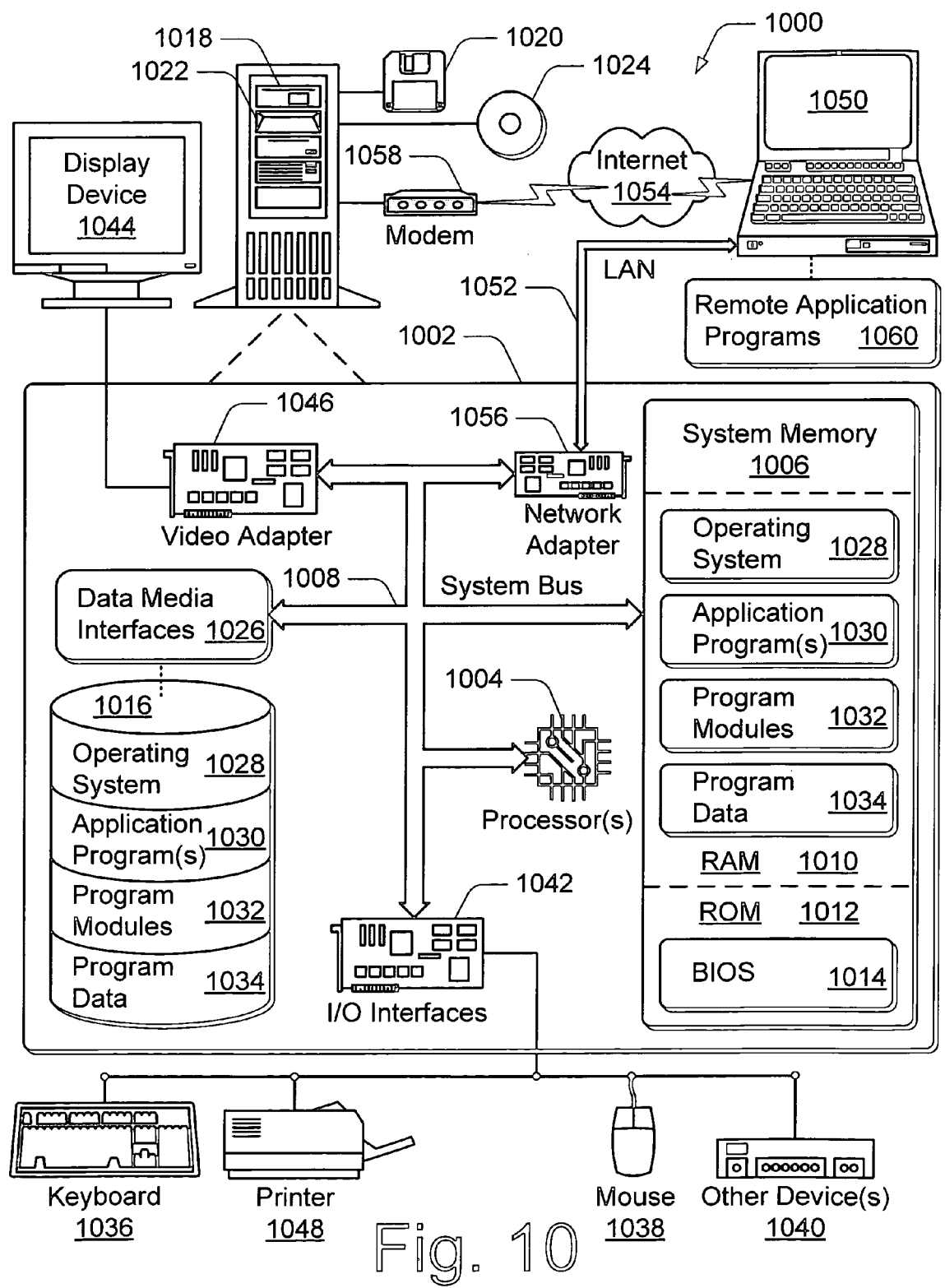
FIG. 10 illustrates exemplary computing systems, devices, and components in an environment that phishing detection, prevention, and notification can be implemented.

FIG. 10 illustrates an exemplary computing environment 1000 within which systems and methods for phishing detection, prevention, and notification, as well as the computing, network, and system architectures described herein, can be either fully or partially implemented. Exemplary computing environment 1000 is only one example of a computing system and is not intended to suggest any limitation as to the scope of use or functionality of the architectures. Neither should the computing environment 1000 be interpreted as having any dependency or requirement relating to any one or combination of components illustrated in the exemplary computing environment 1000.

The computer and network architectures in computing environment 1000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of computing device 1002 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

Computing environment 1000 includes a variety of computer readable media which can be any media that is accessible by computing device 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within computing device 1002, such as during start-up, and is stored in ROM 1012. RAM 1010 typically contains data and/or program modules that are immediately accessible to and/or presently operated on by one or more of the processors 1004.

Computing device 1002 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for computing device 1002.

Any number of program modules can be stored on RAM 1010, ROM 1012, hard disk 1016, magnetic disk 1020, and/or optical disk 1024, including by way of example, an operating system 1028, one or more application programs 1030, other program modules 1032, and program data 1034. Each of such operating system 1028, application program(s) 1030, other program modules 1032, program data 1034, or any combination thereof, may include one or more embodiments of the systems and methods described herein.

Computing device 1002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1002 via any number of different input devices such as a keyboard 1036 and pointing device 1038 (e.g., a "mouse"). Other input devices 1040 (not shown specifically) may include a microphone, joystick, game pad, controller, satellite dish, serial port, scanner, and/or the like. These and other input devices are connected to the processors 1004 via input/output interfaces 1042 that are coupled to the system bus 1008, but may be connected by other interface and bus structures, such as a parallel port, game port, and/or a universal serial bus (USB).

A display device 1044 (or other type of monitor) can be connected to the system bus 1008 via an interface, such as a video adapter 1046. In addition to the display device 1044, other output peripheral devices can include components such as speakers (not shown) and a printer 1048 which can be connected to computing device 1002 via the input/output interfaces 1042.

Computing device 1002 can operate in a networked environment using logical connections to one or more remote computers, such as remote computing device 1050. By way of example, remote computing device 1050 can be a personal computer, portable computer, a server, a router, a network computer, a peer device or other common network node, and the like. The remote computing device 1050 is illustrated as a portable computer that can include any number and combination of the different components, elements, and features described herein relative to computing device 1002.

Logical connections between computing device 1002 and the remote computing device 1050 are depicted as a local area network (LAN) 1052 and a general wide area network (WAN) 1054. Such networking environments are commonplace in offices, enterprise-wide computer networks, intranets, and the Internet. When implemented in a LAN networking environment, the computing device 1002 is connected to a local network 1052 via a network interface or adapter 1056. When implemented in a WAN networking environment, the computing device 1002 typically includes a modem 1058 or other means for establishing communications over the wide area network 1054. The modem 1058 can be internal or external to computing device 1002, and can be connected to the system bus 1008 via the input/output interfaces 1042 or other appropriate mechanisms. The illustrated network connections are merely exemplary and other means of establishing communication link(s) between the computing devices 1002 and 1050 can be utilized.

In a networked environment, such as that illustrated with computing environment 1000, program modules depicted relative to the computing device 1002, or portions thereof, may be stored in a remote memory storage device. By way of example, remote application programs 1060 are maintained with a memory device of remote computing device 1050. For purposes of illustration, application programs and other executable program components, such as operating system 1028, are illustrated herein as discrete blocks, although it is recognized that such programs and components reside at various times in different storage components of the computing device 1002, and are executed by the one or more processors 1004 of the computing device 1002.

Although embodiments of phishing detection, prevention, and notification have been described in language specific to structural features and/or methods, it is to be understood that the subject of the appended claims is not necessarily limited to the specific features or methods described. Rather, the specific features and methods are disclosed as exemplary implementations of phishing detection, prevention, and notification.

The invention claimed is:

1. One or more computer-readable storage media embodying computer readable instructions which, when executed, implement a method comprising:
rendering a messaging user interface to facilitate communication via a messaging application;
receiving a communication from a domain that is located in a country; and
detecting a phishing attack in the communication by at least one of determining that the domain from which the communication is received is similar to a known phishing domain and detecting suspicious network properties of the domain from which the communication is received; wherein detecting suspicious network properties includes the following:
detecting that the communication is received from the domain which is a newly established domain on the internet;
detecting that the communication is received from the domain which has a low static rank;
detecting that the content of the domain which includes multiple user-selectable links to a first network-based resource and the first network-based resource is configured to submit form data to a second network-based resource;
detecting that an IP (Internet protocol) address corresponding to the domain does not correlate with the country where the domain is located; and
detecting a phishing attack in the communication at least in part by examining a user-selectable link within the communication, wherein the communication contains a user-selectable link to a web site with a minimal amount of content or a user-selectable link to a little-trafficked site.

2. The computer-readable storage media as recited in claim 1, wherein detecting the phishing attack includes detecting that a name of the domain is similar in edit-distance to the known phishing domain, the edit-distance being based at least in part on the likelihood of user confusion or on a site-specific change.

3. The computer-readable storage media as recited in claim 1, further comprising comparing the domain to a list of known non-phishing domains to determine that the domain is not a phishing domain.

4. The computer-readable storage media as recited in claim 1, wherein receiving the communication includes receiving an email, and wherein detecting the phishing attack includes examining data in a "From" field of the email.

5. The computer-readable storage media as recited in claim 1, wherein receiving the communication includes receiving an email, and wherein detecting the phishing attack includes examining a display name in a "From" field of the email.

6. The computer-readable storage media as recited in claim 1, further comprising sending an email, and wherein detecting the phishing attack includes examining data in at least one of a "To" field of the email, a "CC" (carbon copy) field of the email, or a "BCC" (blind carbon copy) field of the email.

7. The computer-readable storage media as recited in claim 1, wherein detecting the phishing attack includes determining that the communication at least one of:
- fails anti-spoofing detection;
- contains suspicious text content;
- is received from the domain which does not provide anti-spoofing information; or
- is received via at least one of a dial-up, cable, or DSL (Digital Subscriber Line) communication link.

8. One or more computer-readable storage media embodying computer readable instructions which, when executed, implement a method comprising:
- rendering a messaging user interface to facilitate communication via a messaging application;
- receiving a communication from a domain that is located in a country;
- detecting a phishing attack in the communication by detecting suspicious network properties of the domain from which the communication is received; wherein detecting suspicious network properties includes the following:
- detecting that the communication is received from the domain which is a newly established domain on the internet;
- detecting that the communication is received from the domain which has a low static rank;
- detecting that the content of the domain which includes multiple user-selectable links to a first network-based resource and the first network-based resource is configured to submit form data to a second network-based resource;
- detecting that an IP (Internet protocol) address corresponding to the domain does not correlate with the country where the domain is located; and
- detecting a phishing attack in the communication at least in part by examining a user-selectable link within the communication, wherein the communication contains at least one of:
- a user-selectable link to a web site with a minimal amount of content; or
- a user-selectable link to a little-trafficked site.

9. The computer-readable storage media as recited in claim 8, wherein detecting the phishing attack includes detecting a user-selectable link within the communication that includes at least one of an IP (Internet protocol) address, an "@" sign, or suspicious HTML (Hypertext Markup Language) encoding.

10. The computer-readable storage media as recited in claim 8, wherein detecting the phishing attack includes detecting that the user-selectable link is a user-selectable link to at least one of a domain or a Web page that has a low static rank which is based at least in part on incoming links to the domain or to the Web page.

* * * * *